Feb. 17, 1970  J. R. BREY  3,496,528

ERROR DETECTION AND CORRECTION

Filed Dec. 23, 1966          6 Sheets-Sheet 1

INVENTOR
JAMES R. BREY

ATTORNEY

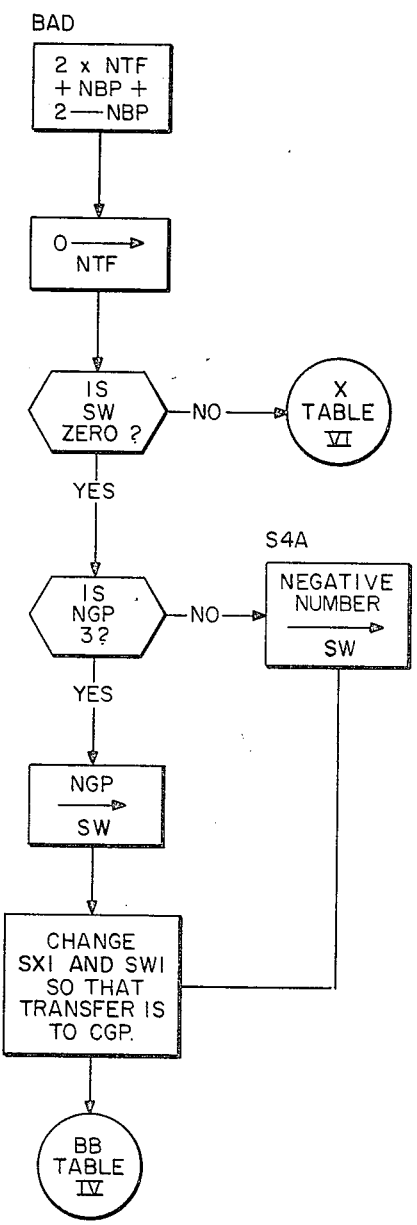
FIG.6
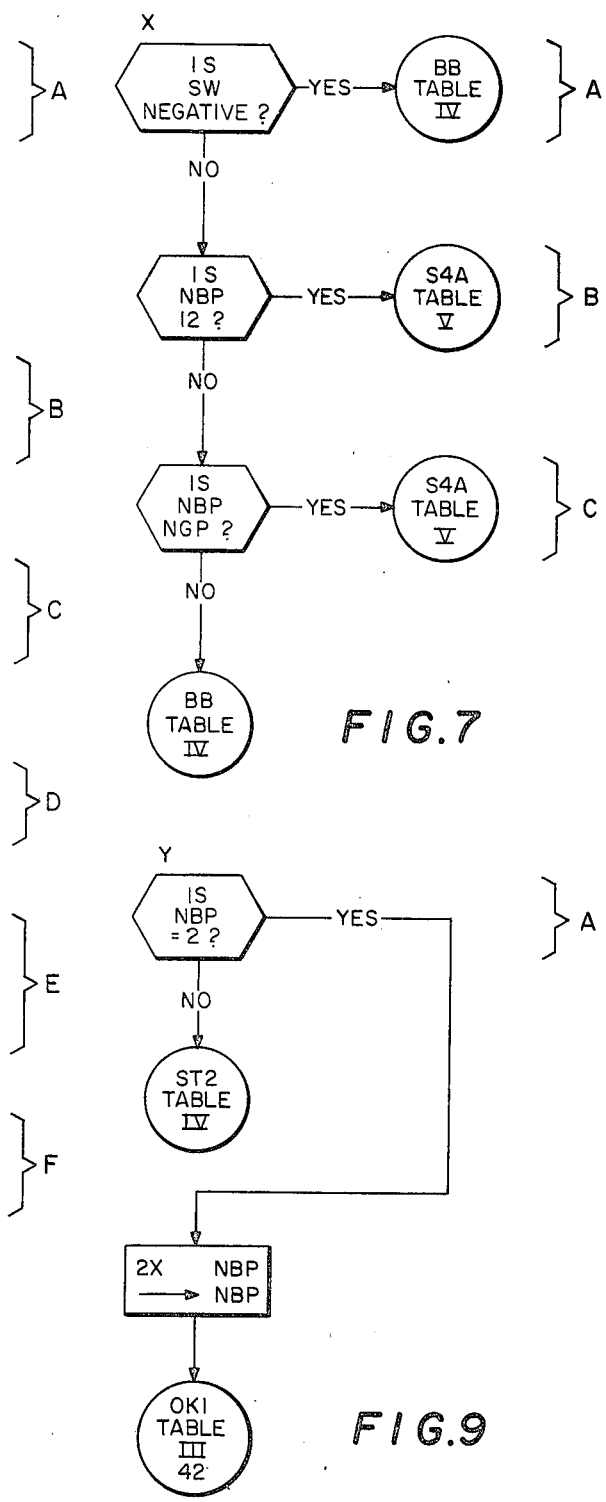
FIG.7
FIG.9

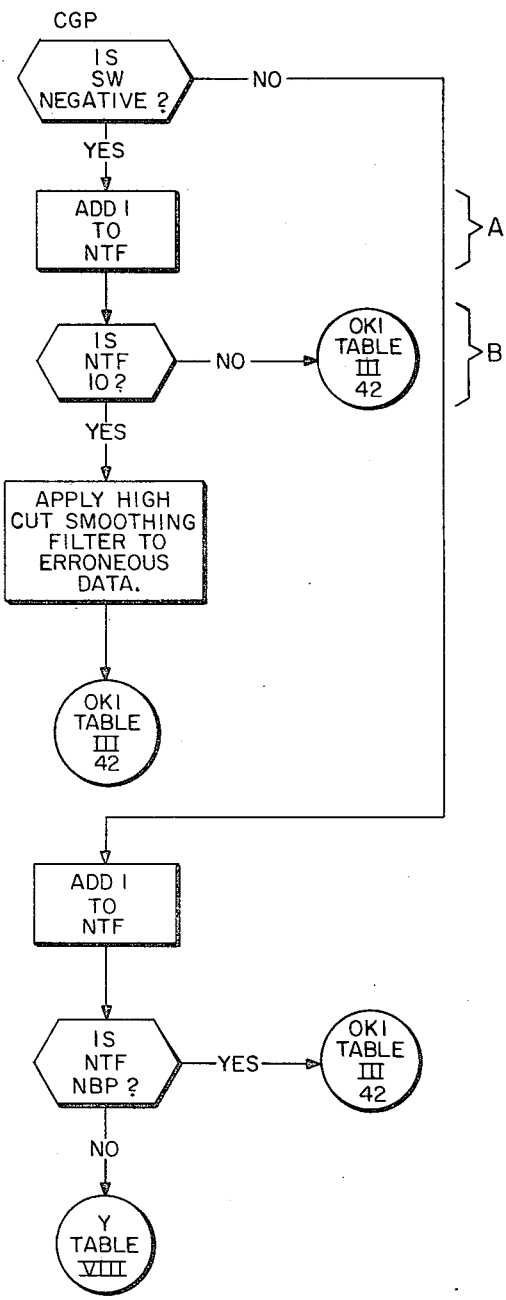
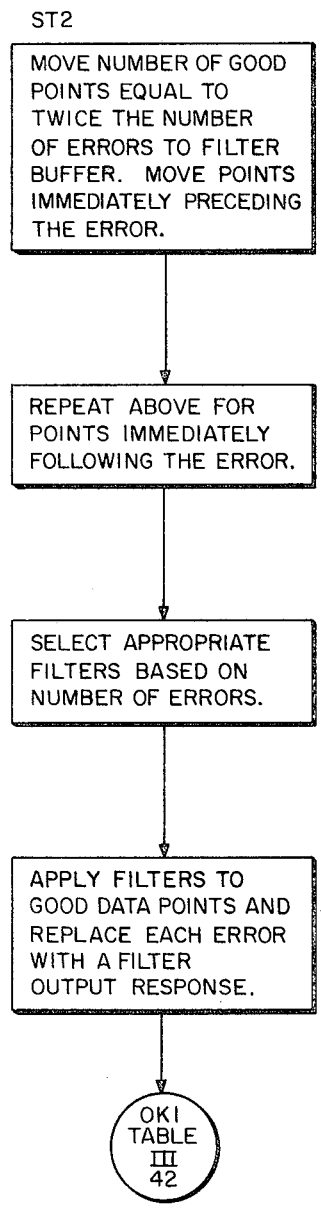
FIG.8
FIG.10

United States Patent Office 3,496,528
Patented Feb. 17, 1970

3,496,528
ERROR DETECTION AND CORRECTION
James Robert Brey, Irving, Tex., assignor to Texas Instruments Incorporated, Dallas, Tex., a corporation of Delaware
Filed Dec. 23, 1966, Ser. No. 604,474
Int. Cl. G01v 1/00
U.S. Cl. 340—15.5                    8 Claims

ABSTRACT OF THE DISCLOSURE

Error detection filtering is applied progressively to a time series to identify erroneous data points and error correction filters are applied to points leading and trailing each erroneous data point to generate a corrected signal and such corrected signal then is applied to the time series to replace the erroneous data point. The correction filter is selected from a set of correction filters in dependence upon the number of erroneous data points in a data gate of selected length.

FIELD OF THE INVENTION

This invention relates to identification and correction of one or more erroneous amplitudes occurring at points in a seismic trace and more particularly, to the generation of a corrected amplitude after identification of an error where the correction is dependent upon a weighted average of the amplitude at a plurality of points preceding and following the point of erroneous amplitude.

DESCRIPTION OF THE PRIOR ART

In seismic exploration, numerous types of instrument errors appear in recorded field data. Such errors may be due to malfunctions of a seismic detector during the operation in which seismic reflections are detected. Further, errors may be introduced in any one of many operations in the data handling process down to and including placing the data in the desired form for ultimate presentation. Useable forms of seismic data include multitrace seismograms, of which there are several varieties, as well as time series stored in phonographically reproducible form and thereby selectively recoverable for subsequent use.

In utilizing seismic traces in a digital form, the output signal from a seismic detector is applied to an analog to digital converter following which it is multiplexed with a pluralty of like signals, similarly converted to digital form, and stored as a multiplexed time series on a reproducible medium such as a magnetic tape. Such an operation is described in Patent No. 3,134,957 of Foote, et al. Such a tape is then employed along with other tapes obtained in the same geological province in order to provide information which will lead to the most accurate possible interpretation of the subsurface structure which gives character to the seismic data. Handling of the seismograms may involve any one or several of many different operations depending upon the nature of the data, the physical constants of the earth in the area in which the seismic record is taken and the ultimate use requested of the data. Representative of the type of operations that are routinely performed on the seismograms are corrections for variations in elevation as between two adjacent detecting stations in a given seismic spread. This requires shifting one seismic trace as a whole relative to the others on a given seismogram so that all traces will bear a same time relation to a given reference horizon. Another well known operation involves correcting each trace of a multitrace seismogram for normal moveout. Such corrections may be considered to change the relative time occurrence of events in a given seismic trace to cause them to appear in a time relationship in which they would otherwise appear had the seismic energy travelled along substantially vertical travel paths. Seismic energy detected by geophones located in a given geophone array generally travels along different slanting travel paths because the geophones are located in the earth's surface at points spaced from one another and from the source of the seismic waves. Other operations may require the reproduction, demultiplexing and then ultilization of digital data words stored on the magnetic tape. A given portion of a seismic trace may be clipped in amplitude, may be of zero amplitude or may have an erroneous amplitude by reason of A–D converter failure. The presence of mechanically induced instrument errors on a seismic trace may appear as dead segments, spikes, and transients. Any operation which follows introduction of such errors will produce erroneous results, the seriousness of which depends upon the nature and degree of the error.

SUMMARY OF THE INVENTION

The present invention is directed to the identification and correction of errors which are normally encountered in treatment of seismic traces. While the invention is primarily concerned with operations involving digitized seismic data, it will be understood that in principle it may be employed in an analog sense as will hereinafter be shown.

In accordance with the invention, means are provided for correcting erroneous seismic traces which includes an error detection filter applied progressively to the trace to identify the location and extent of an erroneous portion of such trace. After identifying the presence of an error, the erroneous section is then replaced with a weighted average of a plurality of points on the seismic trace which both precede and follow the erroneous section.

In a more specific aspect, in a digital operation a relative short error detection filter is progressively applied to the trace as a whole to identify the locations and number of corrections or closely related erroneous digital words in the trace. The erroneous word (or words) is then replaced with a weighted average of a plurality of data words preceding and following the erroneous word. The number of words employed in correction of a given data word, preceding and following the erroneous word, is dependent upon the number of erroneous words consecutively appearing or closely related in the seismic trace.

For a more complete understanding of the invention and for further objects and advantages thereof, reference may now be had to the following description taken in conjunction with the accompanying drawings in which:

FIGURES 6–9 are flow charts illustrating, in connection with the comments keyed to Tables V–VIII, how and when an error should be corrected; and FIGURE 10 is a flow chart illustrating time interpolation filtering employed in one mode of the present invention.

THE PREFERRED EMBODIMENTS

Figure 1:
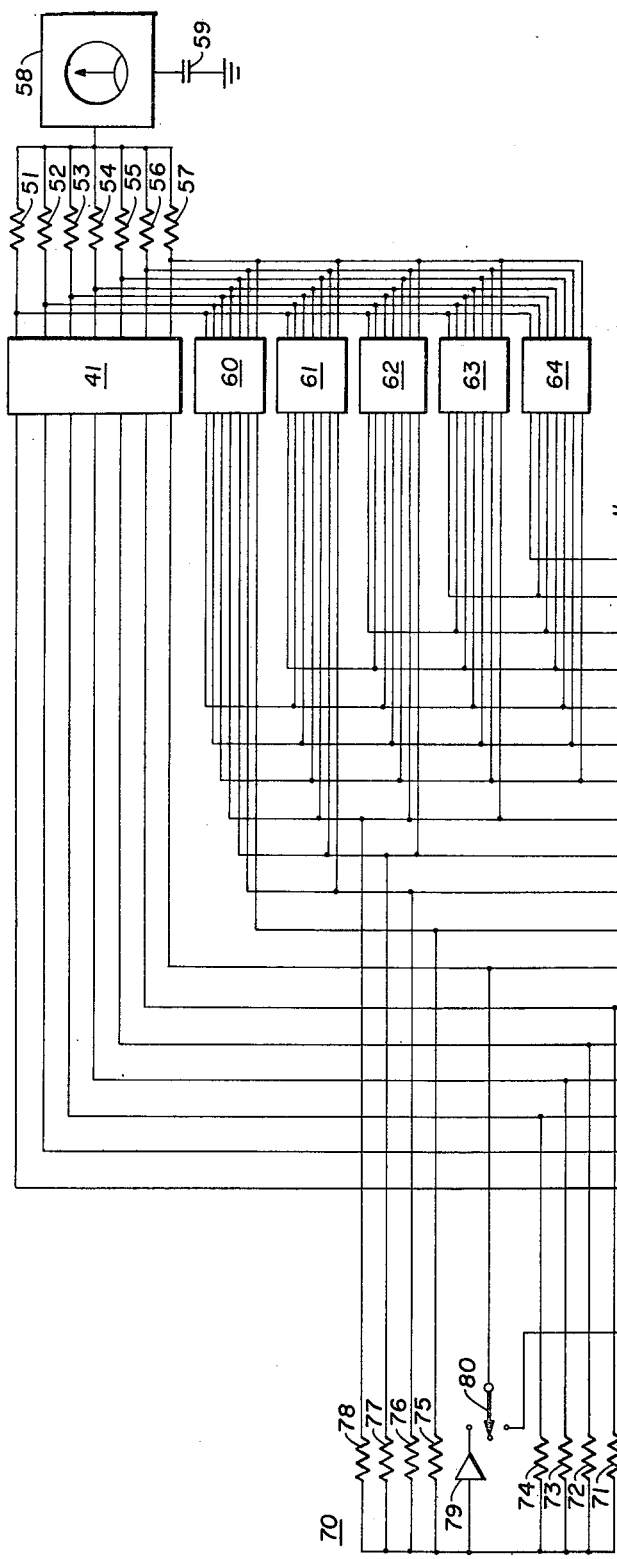
FIGURE 1 is a schematic diagram of an error detection and correction system employing analog components.
Figure 1:
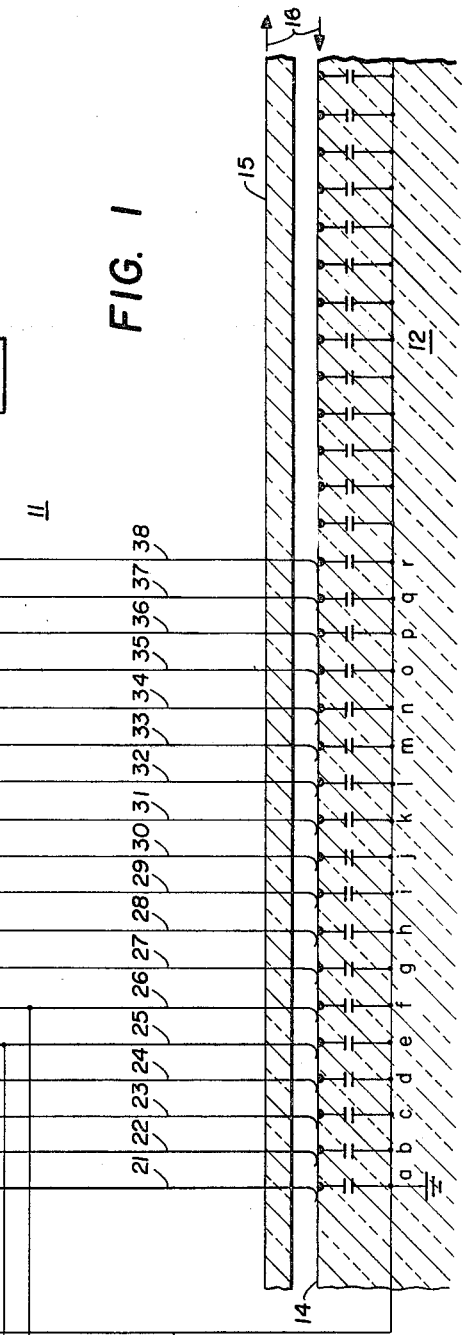

In order to illustrate the method aspect of present invention, FIGURE 1 has been provided to include a capacitive storage unit 10 which stores time spaced samples of a time series upon which operations will be performed. The capacitor bank 12 stores voltages at addresses *a*, *b*, *c*, -*n* at consecutive locations in any array of capacitors.

Such voltages may represent samples of an analog seismic trace with sampling intervals such as 0.002 second or 0.004 second or other selected interval. The seismic trace thus stored may be reproduced by movement of a pickup contact as in the relative directions of arrows 16 in the manner well known in the art, as for example in the McClure et al. Patent No. 2,684,468.

In accordance with the present invention a relatively short error detection filter 11 is employed. Filter 11 is a filter of seven points with a low response to frequencies below 100 cycles/second and high response to frequencies above 100 cycles/second. Other cutoff frequencies may be selected.

Figure 2:
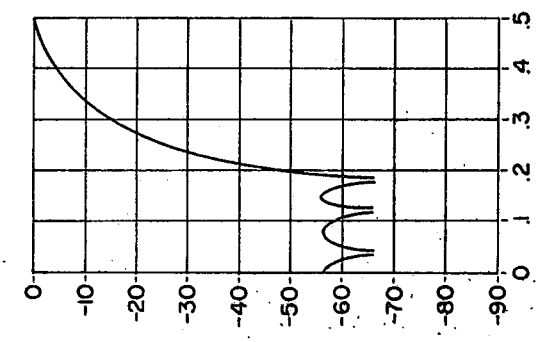
FIGURE 2 is a plot of the response of the filter of FIGURE 1.

The response of the filter in the form that has been found to be satisfactory is indicated in FIGURE 2 wherein the product ($f\Delta t$) of frequency ($f$) and the sampling interval ($\Delta t$) has been plotted as abscissa and the attenuation of the filter has been plotted as ordinates. For sampling intervals of 0.002 seconds it will be seen that the filter response plotted in FIGURE 2 becomes appreciable only above 100 cycles i.e. above the point wherein ($f\Delta t$) equals 0.2. In FIGURE 1, the voltages stored on the condensers at addresses *a–n* appear on the successive channels as the contacts are made between the commutator brushes on pickup structure 15.

With the structure thus described, signals representative of the voltages at the addresses *a–n* may be produced and employed to detect and correct voltages in the series which are erroneous.

The filter whose response is illustrated in FIGURE 2 is a seven-point filter which in FIGURE 1 initially involves only the use of seven channels 21–27. Channels 21–27 are connected by way of gated amplifiers 41 and weighting resistors 51–57 to a comparison unit 58 wherein for each step of the support 12 relative to pickup 15 the voltages on channels 21–27 are summed, squared and compared with a threshold voltage which is applied to unit 58 from a condenser 59.

More particularly, as the unit 12 moves relative to pickup 15, the voltage from the time domain filter, channels 21–27 and weighting resistors 51–57, will vary from step to step. So long as there are no voltage spikes or dead spots (points when capacitors improperly having no voltage thereon) then the voltage applied to the comparison unit 58 will be less than the voltage capacitor 59. However, because of the nature of the error detection filter, if one capacitor such as at the address *g* has a voltage which is improperly higher or lower than the voltages on capacitors at addresses *a–f* then, because of the weighting resistors 51–57, an erroneous voltage signal will appear in the unit 58.

With the appearance of such an erroneous voltage signal, the capacitor at the leading end of the error detection filter is thus identified as having an erroneous voltage thereon. As above described, the location of this capacitor would be the address *g*.

Assume now that the relative motion between carrier 12 and pickup 15 abruptly terminates with channels 21–27 in registration with capacitors at addresses *a–g*. In accordance with the present invention, having identified the erroneous voltage at address *g*, an investigation is then made of the character of the points in the time series at addresses *h–l* to see if the error thus detected is confined to the single address *g* or if it extends to any of the addresses in the next five address locations *h–l*. For this purpose, the amplifiers 41 are de-energized and amplifiers 60 are actuated. Amplifier 60 has seven inputs connected to channels 28–34 and has outputs connected in reverse order but in parallel with the output of amplifier 41. Additional amplifiers 61–64 similarly have their outputs connected in parallel. Amplifier 61 has its seven input channels connected to channels 29–35; amplifier 62, to channels 30–36; amplifiers 63 to channels 31–37; and amplifier 64 to channels 32–38.

When amplifiers 60 are energized, if the voltage on the capacitor at address 28 is in error, then such an indication will be present on unit 58. With amplifiers 60 de-energized and amplifiers 61 energized, if the voltage on the capacitor at address *i* is erroneous, the same will be indicated on unit 58. Thereafter, when amplifiers 61 are de-energized and amplifiers 62 are energized, if the voltage on the capacitors at address *j* is erroneous, the same will be indicated on unit 58; when amplifiers 62 are de-energized and amplifiers 63 are energized, if the voltage on the capacitor at address *k* is erroneous, the same will be indicated on unit 58; and when amplifiers 63 are de-energized and amplifiers 64 are energized, if the voltage on the capacitor at address *l* is erroneous, the same will be indicated.

For the purpose of the present description, it will be assumed that errors greater than six in number in a consecutive relation will not be corrected but that errors less than six will be corrected. In FIGURE 1, a correction generation filter has been illustrated for the case where a single point error is located. That is the pickup unit has moved relative to the support 12 along the time series until chanels 21–27 are in registration with addresses *a–g*, at which time an error at address *g* is indicated. Thereafter, with the amplifiers 41 de-energized and amplifiers 60–64 successively energized, no error is indicated on unit 58. This means that a single point error is present and it is located at address *g*. When this is the case, an error correction filter 70 which includes resistors 71–78 is employed to generate a voltage which is then stored on the capacitor at address *g*. More particularly, the voltages on the four capacitors immediately preceding address *g*, i.e., at addresses *c–f*, are weighted by resistors 71–74. Similarly, the voltages from capacitors at the four addresses *h–k* immediately following address *g* are weighted by resistors 75–78, respectively. The summation of the eight voltages weighted by resistors 71–78 is then applied by way of an isolation amplifier 79 to a terminal on selector switch 80. The selector arm of switch 80 is connected to channel 27. From its normally open terminal, the selector arm is connected to a grounded terminal which removes the charge from the capacitor at address *g*. Thereafter, when the arm of switch 80 is moved to the terminal connected to the output of amplifier 79, the proper voltage generated by the error correction filter 70 is applied to channel 27 and thus to the capacitor at address *g*. Thereafter the relative movement between carrier 12 and pickup 15 may resume to search for additional erroneous points. The foregoing illustrates the method of locating and correcting a single erroneous voltage or data point.

Figure 3:
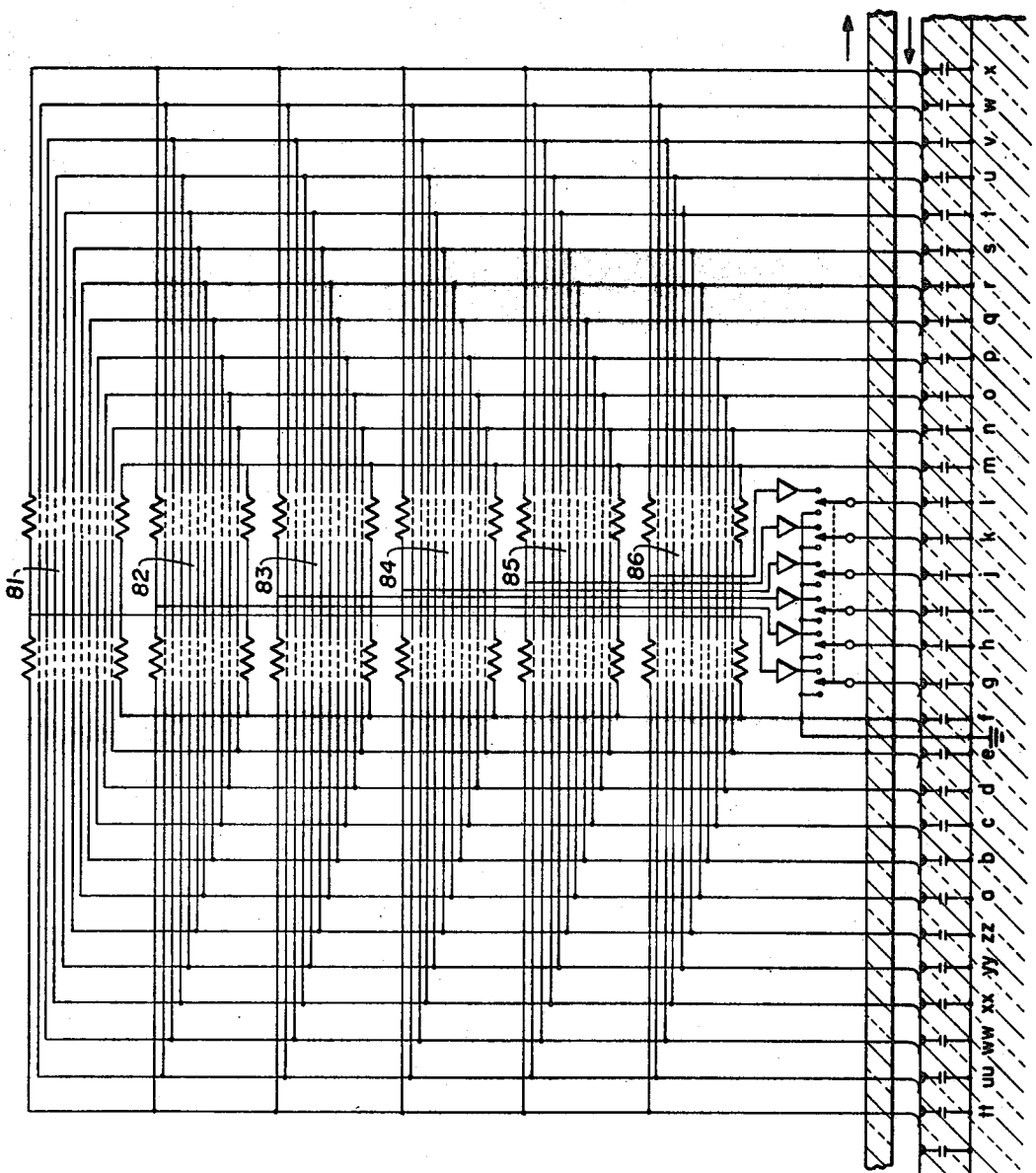
FIGURE 3 illustrates a set of filters for correcting six consecutive erroneous data points.

In FIGURE 3, error correction filters for correcting erroneous voltages in all of six consecutive addresses is illustrated. A different filter is employed for correcting each of the voltages at addresses *g–l*. Further, each of the error correction filters comprises 12 data points, *tt–f*, ahead of the 6 point error data gate *g–l* and 12 points, *m–x*, following the error data gate *g–l*.

More particularly, filter 81 is employed to correct the voltage at address *g*; filter 82 is employed to correct the voltage at address *h*; filter 83 for the voltage at address *i*; filter 84 for the voltage at address *j*; filter 85 for the voltage at address *k*; and filter 86 for the voltage at address *l*.

In each case the nature of the error correcting filter will depend upon the length of the error gate. For example, in FIGURE 1 filter 70 involved 8 points, 4 preceding and 4 following a single erroneous data point at address *g*. In FIGURE 3, for a 6 point error gate including addresses *g–l*, each of the six filters involve 12 points preceding and 12 points following the error data gate. The filters for any erroneous data gate preferably will involve points preceding the error data gate which are in number twice the number of points in the error data gate and likewise will involve points following the error gate of twice the number of points in the error gate with a lower limit on the number of points being not less than four points preceding and four points following the error data gate.

More particularly, based upon the above noted preference, if the error detected and identified by unit 58, FIGURE 1, comprises only one address then filter 70 is selected and employed. Filter 70 applies a new voltage to replace an erroneous voltage by way of channel 27.

If the erroneous section includes two voltages then the two eight point filters will be employed to replace the two erroneous voltages.

If the error section comprises three consecutive voltages then three twelve point filters will be employed to replace three consecutive erroneous voltages.

Four 16 point filters are employed for correcting four consecutive voltages.

Five twenty point filters are employed for replacing five consecutive erroneous voltages.

Six twenty-four point filters 81–86 are employed for correcting six consecutive erroneous voltages. As above noted the length of the error gate dictates the number of points to be employed for generating the correct voltages. The criterion for determining the number of time domain filter points for generating any correct voltage is that there will be used either (1) four valid or non-erroneous points preceding and following the erroneous point to be corrected, or (2) a number equal to twice the number of points in the error gate both preceding and following the error gate whichever is greater.

It has been found that a majority of erroneous data points will be accommodated within the above criterion. More particularly, in seismic operations conducted in accordance with Foote et al. Patent No. 3,134,957 and Baker et al. Patent No. 3,074,636, more than six consecutive non-valid data points is not often encountered. If the error detecting filter provides an indication that more than six consecutive words are in error, then such an extended erroneous section will not be corrected by prediction filters as above described. Rather, a spatial interpolation filter will apply thereto, the interpolation filter being ramped on and off.

In one embodiment of the invention, the error detection filter had the following weights, the channel weight being identified with reference to the weighting of channels 21–27 as provided by resistors 51–57 of FIGURE 1.

TABLE I

| Filter channel: | Weight |
|---|---|
| 21 | 8.192 |
| 22 | −32.411 |
| 23 | 63.479 |
| 24 | −76.516 |
| 25 | 59.536 |
| 26 | −28.187 |
| 27 | 6.515 |

The following table includes the relative weights of preferred error correction filters employed in the present invention:

TABLE II (A) One point gap 0.0403322
0.2000400
−0.5101580
0.8493610

Gap 0.8493610
−0.5101580
0.2000400
0.0403322

(B) Two point gap

| Filter No. 1 | Filter No. 2 |
|---|---|
| − .1422440 | − .1181050 |
| .5914890 | .4549770 |
| −1.2195400 | − .8270450 |
| 1.4940100 | .7538690 |
| Gap | Gap |
| .7538690 | 1.4940100 |
| − .8270450 | −1.2195400 |
| .4549770 | .5914890 |
| − .1181050 | − .1422440 |

(C) Three point gap

| Filter No. 1 | Filter No. 2 |
|---|---|
| − .0298396 | − .0819049 |
| .2430210 | .5221000 |
| − .8478890 | −1.5560200 |
| 1.7672500 | 2.8080200 |
| −2.4125800 | −3.2057300 |
| 2.1259200 | 2.0140200 |
| Gap | Gap |
| .8346810 | 2.0140200 |
| −1.5567900 | −3.2057300 |
| 1.5206400 | 2.8080200 |
| − .9239850 | −1.5560200 |
| .3401010 | .5221000 |
| − .0597911 | − .0819049 |

Filter No. 3

− .0597911
.3401010
− .9239850
1.5206400
−1.5567900
.8346810

Gap 2.1259200
−2.4125800
1.7672500
− .8478890
.2430210
− .0298396

(D) Four point gap

| Filter No. 1 | Filter No. 2 |
|---|---|
| .1013530 | .2283080 |
| − .4854090 | −1.0375500 |
| 1.0628400 | 2.1286600 |
| −1.1678100 | −2.0651200 |
| .0955515 | − .3321370 |
| 1.8049100 | 3.8270400 |
| −3.0410600 | −5.2500500 |
| 2.5424600 | 3.1721900 |
| Gap | Gap |
| .7388280 | 2.2154200 |
| −1.5578900 | −4.2494400 |
| 1.4279300 | 3.5225700 |
| − .4148980 | − .6774900 |
| − .4922450 | −1.5710100 |
| .6699590 | 1.8303900 |
| − .3660560 | − .9434180 |
| .0875793 | .2166080 |

| Filter No. 3 | Filter No. 4 |
|---|---|
| .2166080 | .0875793 |
| − .9434180 | − .3660560 |
| 1.8303900 | .6699590 |
| −1.5710100 | − .4922450 |
| − .6774900 | − .4148980 |
| 3.5225700 | 1.4279300 |
| −4.2494400 | −1.5578900 |
| 2.2154200 | .7388280 |

7

Gap 3.1721900
−5.2500500
3.8270400
− .3321370
−2.0651200
2.1286600
−1.0375500
.2283080

Filter No. 1
− .1191710
.4409090
− .6553560
.1612900
.9394230
−1.3308900
− .1773720
2.7424000
−4.0266500
2.9609900

Gap

.7289530
−1.8756700
2.0750800
− .8655640
− .5862500
1.0199200
− .5182480
− .0302297
.1585420
− .0625431

Filter No. 3
− .3379350
1.0765700
−1.1046200
− .9873090
3.8775300
−3.3568600
−2.4534900
8.8672800
−9.4203400
4.3001100

Gap 4.3001100
−9.4203400
8.8672800
−2.4534900
−3.3568600
3.8775300
− .9873090
−1.1046200
1.0765700
− .3379350

Gap 2.5424600
−3.0410600
1.8049100
.0955515
−1.1678100
1.0628400
− .4854090
.1013530

(E) Five point gap

Filter No. 2
− .2920050
1.0046900
−1.2748700
− .2421510
2.8329200
−3.0476300
−1.3395700
7.1333800
−8.5675400
4.5390000

Gap 2.5006800
−6.0077000
6.1788100
−2.1617900
−2.0509700
2.8909300
−1.1213900
− .4397720
.6207910
− .2139030

Filter No. 4
− .2139030
.6207910
− .4397720
−1.1213900
2.8909300
−2.0509700
−2.1617900
6.1788100
−6.0077000
2.5006800

Gap 4.5390000
−8.5675400
7.1333800
−1.3395700
−3.0476300
2.8329200
− .2421510
−1.2748700
1.0046900
− .2920050

Filter No. 5
− .0625431
.1585420
− .0302297
− .5182480
1.0199200
− .5862500
− .8655640
2.0750800
−1.8756700
.7289530

8

Gap 2.9609900
−4.0266500
2.7424000
− .1773720
−1.3308900
.9394230
.1612900
− .6553560
.4409090
− .1191710

(F) Six Point Gap

Filter No. 1
.0428034
− .0383249
− .3198500
1.0573000
−1.3450500
.2384560
1.5721200
−1.7478200
−9.039360
4.3267700
−5.3274200
3.4122300

Gap

.7389410
−2.2517700
2.9494500
−1.5897900
− .6789990
1.5773200
− .5325280
− .9394420
1.3953200
− .9022960
.3057250
− .0421142

Filter No. 3
.00852697
.7513730
− 3.4873600
6.9992800
− 6.4420800
− .991729
8.947840
− 6.454750
− 7.444320
19.496500
−17.952700
7.198540

Gap 5.663820
−15.41980
18.077800
− 7.961450
− 5.395200
8.863590
− 1.7272500
− 5.9916800
7.2791300
− 4.0419000
1.0907700
− .0769964

Filter No. 2
.0661472
.2037840
− 1.6788500
3.9766200
− 4.1924300
− .0233384
5.4132000
− 4.7271900
− 4.0000300
12.9440000
−13.2933000
6.1615600

Gap 2.8565600
− 8.2774800
10.3006000
− 5.0593300
− 2.7361400
5.3050100
− 1.4208200
− 3.3744600
4.5337400
− 2.7329000
.8417110
− .0935654

Filter No. 4
− .0769964
1.0907700
− 4.0419000
7.2791300
− 5.9916800
− 1.7272500
8.8635900
− 5.3952000
− 7.9614500
18.0778000
−15.4198000
5.6638200

Gap 7.1985400
−17.9527000
19.4965000
− 7.4443200
− 6.4547500
8.9478400
− .9917290
− 6.4420800
6.9992800
− 3.4873600
.7513730
.00852697

| Filter No. 5 | Filter No. 6 |
|---|---|
| — .0935654 | — .0421142 |
| .8417110 | .3057250 |
| — 2.7329000 | — .9022960 |
| 4.5337400 | 1.3953200 |
| — 3.3744600 | — .9394420 |
| — 1.4208200 | — .5325280 |
| 5.3050100 | 1.5773200 |
| — 2.7361400 | — .6789990 |
| — 5.0593300 | —1.5897900 |
| 10.3006000 | 2.9494500 |
| — 8.2774800 | —2.2517700 |
| 2.8565600 | .7389410 |
| Gap | Gap |
| 6.1615600 | 3.4122300 |
| —13.2933000 | —5.3274200 |
| 12.9440000 | 4.3267700 |
| — 4.0000300 | — .9039360 |
| — 4.7271900 | —1.7478200 |
| 5.4132000 | 1.5721200 |
| — .0233384 | .2384560 |
| — 4.1924300 | —1.3450500 |
| 3.9766200 | 1.0573000 |
| — 1.6788500 | — .3198500 |
| .2037840 | — .0383249 |
| .0661472 | .0428034 |

The foregoing description has made reference to analog type devices and operations wherein voltages representative of uniformly spaced data sample points are stored on capacitors in a manner to facilitate playback or testing of the stored data. It will be apparent that the method of the invention may be carried out on a step by step basis to correct any errors in series of sample points stored capacitively.

A preferred mode of carrying out the present invention involves the use of a high speed digital computer. Thus, the data preferably will be stored on magnetic tape in the manner described in U.S. Patent 3,134,957 to Foote, et al. Each word at addresses $a$, $b$, $c$, etc., will correspond with addresses $a$, $b$, $c$, etc. in FIGURES 1 and 3 but will be in the form of a plurality of bits recorded in parallel on laterally spaced tracks on a magnetic tape.

The following description is based upon a time series in the form of digitized data words representing a single seismic trace available under computer control for transfer into a suitable operating register system wherein each of the steps above described with respect to detection of a first error, sampling the time series beyond the first error to determine the length of the error gate, and applying suitable filters for replacing erroneous data words with corrected data words.

Preferably, the computer employed will be of the type described and claimed in Baker et al. Patent No. 3,074,636, more generally identified as Texas Instruments Automatic Computer Model No. 827. Such computer and instructions for programming the same are described and set out in Programming Instruction Manual, Texas Instruments Automatic Computer Model 827. Texas Instruments, Inc. 1964 and the same is included herein by reference.

Figure 4:
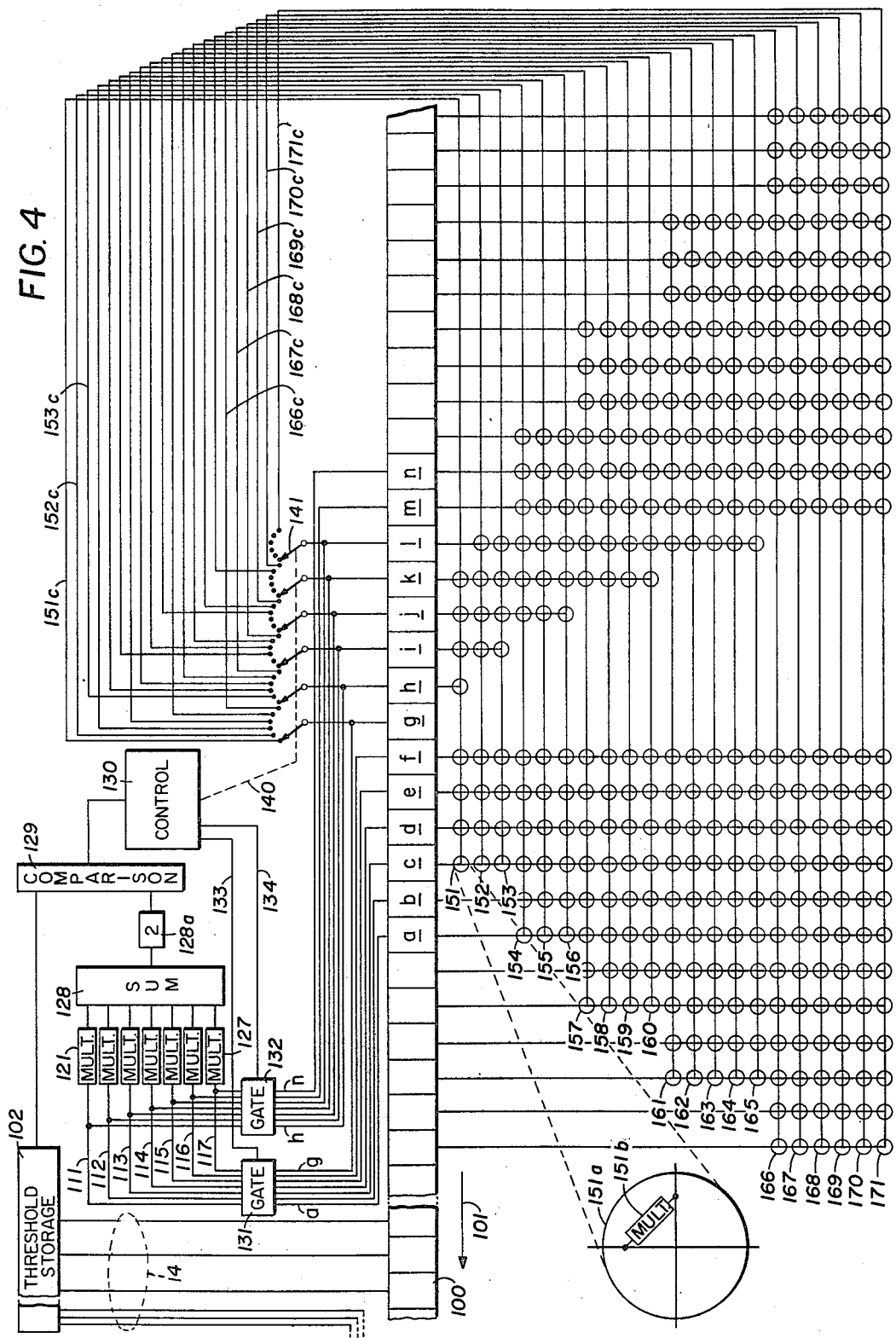
FIGURE 4 illustrates an embodiment of the invention wherein digital data is employed.

The flow of data in such operation is illustrated in FIGURE 4. In this system, data words are transferred from magnetic tape or other suitable manner into a register 100 wherein the data words are moved progressively through the register 100 in the direction of arrow 101. The presence of error in the time series thus moved through register 100 is detected initially by applying to a threshold storage unit 102 a threshold signal representative of the average power of all of the data words over a given reference gate determined, in a preferred mode of operation, in accordance with Equation 1 set out below. As indicated such average power may be derived from a plurality of data words which may or may not include those of the seven channels 111–117. As shown Channels 104 supply the input reference voltage.

Channels 111–117 are multibit channels. They lead to multiplier units 121–127, the outputs of which are applied to a summation unit 128. The multipliers 121–127 have multiplication factors or weights according to the values set out in Table I for the error detection filter. The output of the unit 128 is squared in unit 128a and is then applied to a comparison unit 129 whose output in turn is connected to a control unit 130.

Transmission of data words from addresses $a$–$g$ is controlled by a multi-channel gate 131. As the error detection filter looks forward, it will detect the first erroneous data word in any error gate. Upon sensing such an error through operation of comparison unit 129, gate 131 is closed and gate 132 is open so that the error detection filter operates in a reverse direction to determine the length of the error gate. As indicated by control channels 133 and 134, gates 131 and 132 as well as four additional data gates (not shown) are actuated under the control of unit 130.

Gate 131 thus controls application of words at addresses $a$–$g$ to the error detection filter. Gate 132 controls application of data words at address $h$–$n$ to the error detection filter in reverse order. As above described, additional control units are provided for successive data gates (not shown) which effectively move one address at a time away from the error address $g$.

The control unit 130 is coupled by linkage 140 to a multi-position selector unit 141.

If it is found that a single error is present and is located at address $g$ then filter 151 is employed. Filter 151 employs the four data words at addresses $c$–$f$ preceding the erroneous data word $g$ and the four data words $h$–$k$ following the erroneous data word $g$. The circle 151a has been illustrated enlarged as to indicate that at each intersection of channels in FIGURE 4 that there will be a multiplier such as the multiplier 151b. Multiplier 151b is a multibit digital multiplying unit having as a multiplicand the factor corresponding with the first element of filter in Table I. The multiplier is the data word at address $c$. Thus, there is provided on the output channel 151c from filter 151c from filter 151 a data word which has the correct value for the time series in question at the address $g$.

The selector unit 141 in the position indicated will apply the correct data word to address $g$ replacing the erroneous data word.

Eight point filters 152 and 153 are employed to apply signals by way of channels 152c and 153c to the selector unit 141 which, when in its second position, will replace erroneous data words at addresses $g$ and $h$, respectively. Similarly, a three-word error gate is corrected by using filters 154–156 in conjunction with selector 141 in its third position.

A four-word error gate is corrected by employing filters 157–160 in conjunction with selector 141 in its fourth position to replace erroneous data words at addresses $g$, $h$, $i$ and $j$, respectively. In a similar manner, filters 161–165 are employed to correct a five-data word error gate with selector 141 in its fifth position. Filters 166–171 are employed for a six-word error gate with the selector 141 in the last or sixth position.

In the latter operation, the signal on channel 166c is applied to the sixth channel on the first section of selector 141. The signal from filter 167 is applied by way of channel 167c to the sixth channel on the second section of selector 141. The signal from filter 168 is applied by way of channel 168c to the sixth channel of the third section of selector 141. The signal from filter 169c is applied to the sixth channel of the fourth section of selector 141 by way of channel 169c. The signal from filter 170 is applied by way of channel 170c to the sixth channel on the fifth section of selector 141. The signal from filter 171 is applied by way of channel 171c to the sixth channel of the sixth section of selector 141.

In each case, the filters will have the weights specified in Table II.

The following program has been found to be satisfactory for carrying out the invention above described and is set forth in terms specified by the above identified Programming Instructions Manual for the Texas Instruments Automatic Computer Model 827.

In this program outline:

(1) Most storage initialization has been omitted;
(2) Coding peculiar to the computer being used and not otherwise necessary has been omitted; and
(3) Constant areas and storage areas have not been set up separately.

The portion of the program which follows is concerned with detecting errors and developing the power summation to be used in developing the threshold level.

TABLE III

| Octal Machine Level Inst. | Symbolic Location | Mnemonic Op. Code | Symb. Adr. | Symb. Modifier Index Tag | |
|---|---|---|---|---|---|
| 000077 | | ORG | | 63 | Begin routine at core Location 77₈. |
| 061651 | RET | LLB | ZRO | | Load loop block register with initial time address (0) of data on drum. |
| 070474 | PTI | LLC | LC | | Load loop channel register with contents of LC (space address of data word on drum). |
| 320000 | | LWM | | | Bring one data sample from drum address selected into MQ register. |
| 504045 | LXI | LXR | | 37B | Load index register B to point to last position of rotating 36 point data buffer used. |
| 464105 | | DXN + | | 02B | Decrement index register B to point to next available position of data buffer, jump if index register nonzero. |
| 504044 | | LXR | | 36B | If index register B is zero (end of buffer) reload index register B to point to first position of data buffer. |
| 514102 | | SXR | LXI | B | Store the contents of index register B in address of location LXI above. B will be reloaded on the next loop through. |
| 434542 | | SMQ | BUF | B | Store data word in MQ into buffer. |
| 504016 | LBI | LXR | | 14B | Load index register B with value to be used by forward filtering process to address the data buffer. |
| 464112 | | DXN + | | 02B | Decrement index register B. If nonzero skip the next instruction. |
| 504044 | | LXR | | 36B | If index register B is zero reload to 36 (points to start of data buffer). |
| 514107 | | SXR | LBI | B | Store the contents of index register B in address of location LBI above. |
| 502010 | | LXR | | 08A | Load index register A with value to be using by filtering process to address the filter point buffer. |
| 440606 | | FIL | FFA | | Apply error detection filter in forward direction to portion of data buffer. Filtering process consists of:<br><br>$$\sum_{i=1}^{8} f_i\, t_{x+i-1}$$<br><br>where $f_i$ is response of filter point $i$, $t_{x+i-1}$ is an individual data sample. The index $i$ corresponds to index register A, the index $x$ to index register B. |
| 020003 | | SAL | | 3 | Shift filter output to retain maximum significance without overflow. |
| 100031 | 25 | AMQ | | 25 | Transfer filter output response from the accumulator to the MQ. |
| 430000 | | SMQ | TMP | | Filter output response to temporary storage. |
| 660000 | | MPY | TMP | | Square filter output response (power). |
| 410000 | | STD | TMP | | Store power (temporary). |

TABLE III—Continued

| Octal Machine Level Inst. | Symbolic Location | Mnemonic Op. Code | Symb. Adr. | Symb. Modifier Index Tag | |
|---|---|---|---|---|---|
| 502010 | | LXR | | 8A | Load index register A to be used if reverse filter is applied. |
| 610420 | | SDL | THR | | Subtract threshold level set on previous 200 millisecond gate from power. Threshold is developed from power spectrum exclusive of erroneous points in the previous gate. |
| 100000 | | AMQ | | | Move remainder to MQ from accumulator. |
| 504007 | RPI | LXR | | 07B | Load index register B with value to be used by reverse filtering process to address data buffer. |
| 464130 | | DXN + | | 02B | Decrement index register B. If nonzero skip the next instruction. |
| 504044 | | LXR | | 36B | If index register B is zero reload to 36. |
| 514125 | | SXR | RPI | B | Store the contents of index register B in the address portion (low order 10 bits) of location RPI above. |
| 764542 | | CAM | BUF | B | Place absolute value of data word in accumulator. |
| 010372 | | JZE | BAD | | Absolute zero is a possible converter failure. Transfer to service errors. |
| 711652 | | SUB | CLP | | Subtract 017776₈ for 9,000 recording system or 037776 for 10,000 recording system. These numbers are one less than the largest values the systems are capable of recording (overshoot or clipping). |
| 014372 | | JPL | BAD | | Jump to service errors (a clip count could be updated). |
| 110000 | | MQA | | | Threshold-Power. |
| 016150 | SWI | JMI | OKI | | If negative the power of the filter output result exceeds the threshold level, an error is indicated by the forward filter and the reverse filter will be applied. If non-negative the point is good. When the routine is processing a group of errors this transfer will be changed to update counts of good and bad points, etc. (See CGP). |
| 440612 | FRI | FIL | RFL | | Apply error detection filter in reverse direction to portion of data buffer. Filtering process consists of:<br><br>$$\sum_{i=1}^{8} f_{9-i}\, t_{x+i-1}$$ |
| 020003 | | SAL | | 3 | Shift filter output to retain maximum significance without overflow. |
| 100000 | | AMQ | | | Move filter output to MQ from accumulator. |
| 430000 | | SMQ | TMP | | Filter output response to temporary storage. |
| 660000 | | MPY | TMP | | Square filter output response. |
| 410000 | | STD | TMP | | Power to temporary storage. |
| 610420 | | SDL | THR | | Subtract threshold level set on previous gate from power. |
| 014372 | | JPL | BAD | | If power exceeds threshold transfer to process erroneous data point. |
| 530150 | SXI | UNC | OKI | | When the routine is processing within a group of erroneous points this transfer will be altered to update counts of good, bad points, etc. (See CGP). |
| 620010 | OKI | CAD | NGP | | Double length word to A and B accumulators. Word contains a count of good points since the last error was encountered and a count of the total good points since the beginning of the current 200 millisecond threshold gate. |
| 600616 | | ADL | ONE | | Add the contents of locations ONE, ONE+1 to the double length accumulator. Increment each count by one. |
| 410010 | | STD | NGP | | Store updated counts. |
| 620000 | | CAD | TMP | | Acquire power from temporary storage and place in the A and B accumulators. |
| 600026 | | ADL | PWR | | Add in the previous double length power summation for the 200 millisecond gate. |
| 410026 | | STD | PWR | | Store the double length SUM in PWR. Update power summation. |

The following portion is concerned with developing a model of the data threshold level based on the power spectrum for use in detecting erroneous data samples. The following method is used:

$$Ti = \frac{i-1}{i} \cdot T_{(i-1)} + \frac{45}{i} \cdot \frac{P}{N} \qquad (1)$$

where:

T=threshold level, initially set to zero;
i=count of threshold gates completed;
P=summation of powers of filter responses over gate length;
N=number of data samples involved in the summation.

TABLE IV

| | | | | |
|---|---|---|---|---|
| 720430 | BB | CLA | TIM | Dimensionless time count. |
| 700616 | | ADD | ONE | Update count (Add 1). |
| 400430 | | STR | TIM | Store updated count in TIM (time counter). |
| 721714 | | CLA | GTI | Acquire next threshold gate time (dimensionless) and place in accumulator. |
| 100000 | | AMQ | | Move contents of accumulator to MQ. |
| 710430 | | SUB | TIM | Next threshold gate time-current time. |
| 014266 | | JPL | IBR | If remainder is positive the end of gate has not been reached, otherwise a gate end has been reached and threshold level should be updated. |
| 110000 | | MQA | | Next threshold gate time from MQ to the "A" accumulator. |
| 700434 | | ADD | 200 | Add contents of 200 (200 milliseconds divided by sample rate of data) to threshold gate time. |
| 401714 | | STR | GTI | Store next threshold gate time in GTI. |
| 720042 | | CLA | NGT | Number of threshold gates encountered to "A" accumulator. |
| 700616 | | ADD | ONE | Update gate count by adding contents of ONE (1) to the accumulator. |
| 400042 | | STR | NGT | Store accumulator in NGT, updated threshold gate count. |
| 620026 | | CAD | PWR | Power summation to A and B accumulators. |
| 640011 | | DIV | NGP 01 | Normalize power. Divide by number of points contributing to the summation to get average power in gate. |
| 660435 | | MPY | C45 | Multiply quotient (average power) by factor of 45 contained in C45. |
| 020006 | | SAL | 6 | Align decimal point. |
| 610420 | | SDL | THR | Subtract THR (previous threshold level) from double length accumulator. |
| 410000 | | STD | TMP | Store remainder in TMP (temporary storage). (45 x Avg. Power)—Previous threshold |
| 720616 | | CLA | ONE | Contents of ONE (1) to accumulator. |
| 640042 | | DIV | NGT | Divide by current number of threshold gates. |
| 660001 | | MPY | TMP 01 | Multiply by least significant half of double length remainder from above. |
| 022021 | | SAR | 17 | Align decimal point. |
| 670000 | | MPA | TMP | Multiply and accumulate with the most significant half of the remainder. The previous three instructions accomplish double length multiplication. |
| 600420 | | ADL | THR | Add previous threshold level. |
| 410420 | | STD | THR | Store updated double length threshold level in THR. |
| 140100 | IBR | IBR | PTI | Increment loop block register (update time address on drum) and transfer to process next data sample. |

Tables V-VIII contain details relating to the flowcharts of FIGURES 6-9, respectively, which show the process of deciding how and when a given error should be corrected.

TABLE V

FIGURE 6:     Comment
A     Sum twice the contents of NTF and the contents of NBP and a constant of 2. NTF contains the number of good points separating any two errors or groups of errors where the number of good points is insufficient to correct the first group of errors.
B     If SW is zero this is the first error encountered.
C     At least four good points on each side are needed for time interpolation filtering of the smallest number of errors (1).
D     A positive nonzero number in SW indicates to the routine that a group of errors is being processed which to this point can be time interpolated. A negative number indicates the group cannot be time interpolated.
E     Transfers in main loop are altered so that routines will make decisions on when sufficient good points have been processed to correct errors.
F     Transfer to BB, bypass power summation on bad points.

TABLE VI

FIGURE 7:     Comment
A     If SW is negative the error gate is too wide and the errors will be filtered using a high-cut smoothing filter.
B     If the number of bad points exceeds 6 (NBP/2) the error gate or group cannot be interpolated.
C     If the number of good points preceding the first error is less than twice the number of errors the error gate cannot be interpolated.

TABLE VII

FIGURE 8:     Comment
A     Increment NTF (Number of good data samples since the last error was found).
B     The number of trailing good points must at least equal the length of the filter (11 points).
C     The number of trailing good data samples must be twice the number of erroneous samples (This count includes any good points contained within the error gate).

TABLE VIII

FIGURE 9:     Comment
A     If the number of bad points (NBP contains twice the number of bad points) is one then four trailing good points are required for time interpolation correction.

FIGURE 10 is concerned with the time interpolation filtering. This illustrates a process which weights good points on each side of an error to approximate the value which should replace the erroneous point.

FIGURE 5

Figure 5:
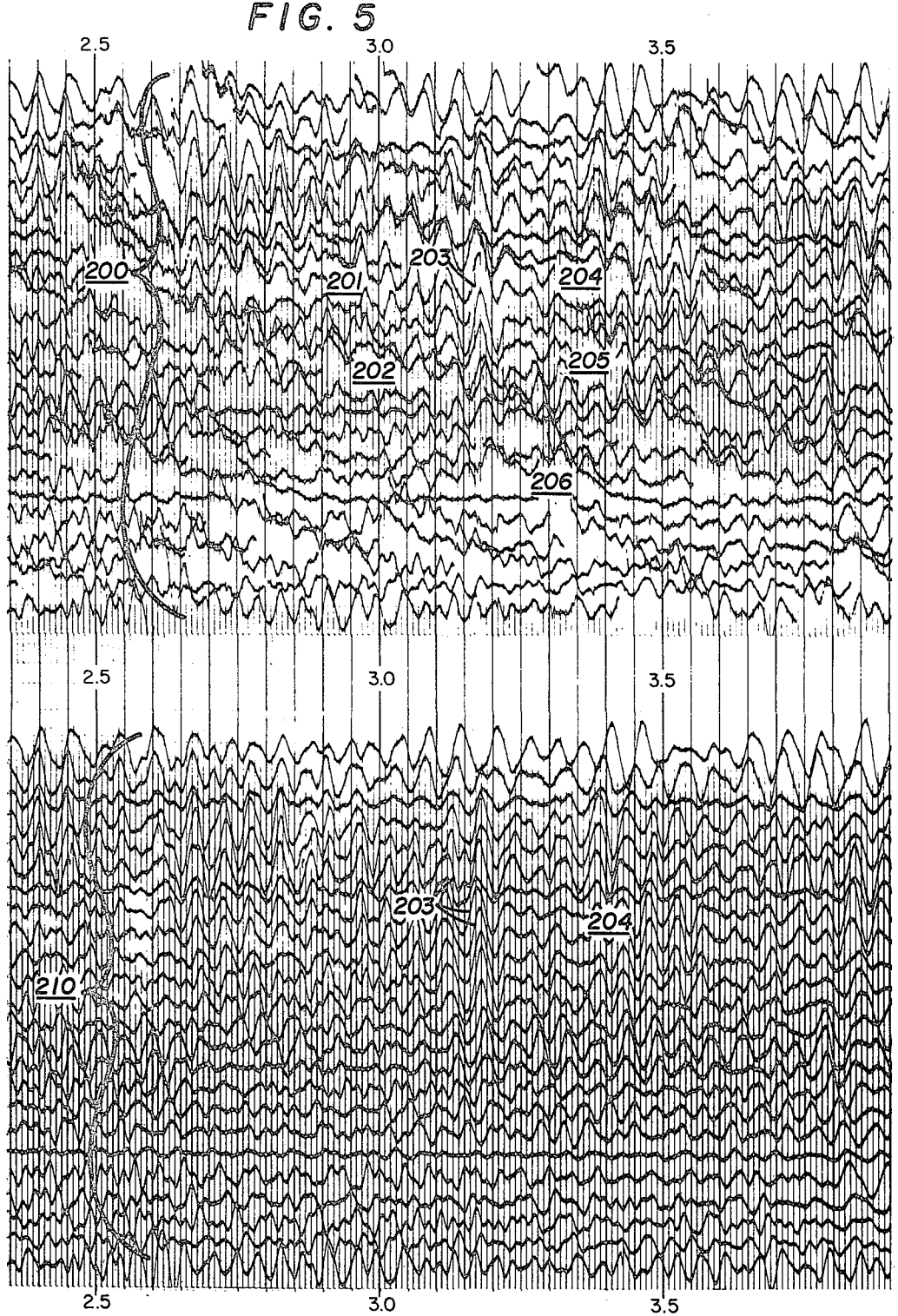
FIGURE 5 illustrates a portion of a seismogram employed in the invention and results accruing from use of the invention.

In FIGURE 5, the results of applying the invention through use of the above identified computer successively to each of 24 traces of a 24 trace seismogram 200 has been illustrated. Seismogram 200 initially was recorded in multiplex form in accordance with the Foote et al. Patent No. 3,134,957 and thereafter demultiplexed to form relationships graphically shown in the upper half of FIGURE 5. It will be understood that only the section of the seismogram centered at a seismic record time of 3.0 seconds has been included in FIGURE 5. The time scale for seismogram 200 as demultiplexed is shown at the margins of the upper seismogram 200. It is readily apparent that there are many points in this seismogram where the data clearly is in error such as points 201, 202 and 203, for example clearly involve erroneous data. Many other areas such as points 204, 205 and 206 similarly stand out as involving such error as to render the reliable interpretation of the seismogram almost impossible.

The lower record 210 illustrates the actual results obtained from treatment in accordance with the present invention of the record 200. There is a trace correspondence between the data except that the gaps and erroneous sections present at record 200 have been completely corrected in an intelligible manner in a record 201. Note particularly the elimination of the errors at point 203 from traces 8 and 9 of record 200. The corresponding points on traces 8 and 9 of record 210 have been indicated by the reference character 203. Similarly, the zone 204 has been corrected as well as all other clearly erroneous points in record 200. Having described the invention in connection with certain specific embodiments thereof, it is to be understood that further modifications may now suggest themselves to those skilled in the art and it is intended to cover such modifications as fall within the scope of the appended claims.

What is claimed is:

1. The method of correcting erroneous data points in a time series in the form of successive time spaced samples of a seismic trace which comprises:
    (a) applying said series to automated data process means structured as a multipoint time domain error detection filter to identify the location of an erroneous data point in said series, and
    (b) applying said series to automated data processing means structured to replace said erroneous data point using a data point determined from a weighted average of a plurality of data points preceding and following said erroneous data point.

2. The method of claim 1 wherein the number of points preceding the erroneous point equal the number of points following said erroneous point.

3. The method of correcting erroneous digital words in a digital seismic trace which comprises:
    (a) applying said trace to automated data processing means structured as an error detection filter for location of an erroneous section of said trace and the number of consecutive erroneous words in said section, and
    (b) applying said trace to automated data processing means structured to replace said erroneous words at said location with corrected words each representative of a weighted average of a predetermined number of non-erroneous data words in said trace preceding said section and following said section where the number and locations of said non-erroneous data words are dependent upon the number and location of erroneous data words in said section.

4. The method of correcting an erroneous data word in a time series of data words stored in reproducible form which comprises:
    (a) applying said series to automated data processing means structured as an error detection filter to identify the location and number of consecutive erroneous data words,
    (b) generating in an automated data processing means a corrected word to replace said erroneous data word by production of a weighted average of selected non-erroneous data words preceding and following the erroneous data word, and
    (c) applying said trace to automated data processing means wherein said corrected word is substituted for said erroneous data word.

5. A system for correcting erroneous data words in a time series stored in reproducible form which comprises:
    (a) automated data processing means simulating a multi-element time domain error detection filter,
    (b) means for applying said simulated filter to said time series progressively along the time scale thereof to identify the location in said time series of erroneous data words,
    (c) automated data processing means simulating a plurality of time domain error correction filters having center gaps of progressively increasing number of data words with the number of data points on each side of said center gap proportional in number to the length of said gap and dependent upon said length,
    (d) automated data processing means for selecting one of the simulated time domain filters in dependence upon the number of consecutive erroneous data words identified at a given location by said simulated error detection filter, and
    (e) means for applying said one of the simulated time domain filters to said time series to replace an erroneous data word in said gap and at said location with the output of said one of said error correction filters.

6. The method of error detection and correction in a time series which comprises:
    (a) applying an error detection filter structured in an automated data processing machine progressively to consecutive sets of data points in said time series while moving in one direction along said series to locate a first erroneous data point, with said sets overlapping one another and differing one from the other by one data point,
    (b) reversing said error detection filter structured in said automated data processing machine at said first erroneous data point to detect any erroneous data points immediately following said first data point, and
    (c) applying the output signal of an error correction filter structured in said automated data processing machine to said first data point, which output signal is a weighted summation of a plurality of data points both preceding and following said erroneous data point.

7. The method of claim 6 wherein the number of data points employed in said error correction filter is dependent upon the number of erroneous data points immediately following said first data point.

8. The method of claim 7 wherein there is employed in said error correction filter a number of data points following said erroneous data point and a number of data points preceding said erroneous data points equal to at least twice the number of erroneous data points adjacent one to the other but not less than four.

No references cited.

RODNEY D. BENNETT, Jr., Primary Examiner

D. C. KAUFMAN, Assistant Examiner

U.S. Cl. X.R.

235—153; 340—146.1, 172.5